(12) United States Patent
Lee et al.

(10) Patent No.: US 10,481,641 B2
(45) Date of Patent: Nov. 19, 2019

(54) MOBILE TERMINAL

(71) Applicant: LG ELECTRONICS INC., Seoul (KR)

(72) Inventors: Minjong Lee, Seoul (KR); Sunggyu Koh, Seoul (KR); Jongkyu Ju, Seoul (KR); Sanghyuk Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/963,009

(22) Filed: Apr. 25, 2018

(65) Prior Publication Data

US 2019/0243424 A1 Aug. 8, 2019

(30) Foreign Application Priority Data

Feb. 8, 2018 (KR) .......................... 10-2018-0015454

(51) Int. Cl.
*G06F 1/16* (2006.01)
*H04M 1/02* (2006.01)

(52) U.S. Cl.
CPC .......... *G06F 1/1652* (2013.01); *G06F 1/1679* (2013.01); *G06F 1/1681* (2013.01); *H04M 1/0268* (2013.01)

(58) Field of Classification Search
CPC .... G06F 1/1652; G06F 1/1616; G06F 1/1681; G06F 1/1679; H04M 1/0268; H04M 1/02616; H05K 1/028; H05K 5/0017
USPC ........... 361/679.01, 679.02, 679.04–679.09, 361/679.26–679.3, 679.55–679.59; 455/575.1–575.9
See application file for complete search history.

(56) References Cited

U.S. PATENT DOCUMENTS

| | | | |
|---|---|---|---|
| 8,442,593 B1 | 5/2013 | Kwon et al. | |
| 9,572,272 B2* | 2/2017 | Lee | H04M 1/0216 |
| 2014/0029171 A1* | 1/2014 | Lee | H05K 7/16 |
| | | | 361/679.01 |

(Continued)

FOREIGN PATENT DOCUMENTS

EP 2993551 3/2016

OTHER PUBLICATIONS

European Patent Office Application Serial No. 18166613.2, Search Report dated Jul. 24, 2018, 8 pages.

*Primary Examiner* — Steven T Sawyer
*Assistant Examiner* — Sagar Shrestha
(74) *Attorney, Agent, or Firm* — Lee, Hong, Degerman, Kang & Waimey

(57) ABSTRACT

There is disclosed a mobile terminal comprising A mobile terminal comprising: a display unit which is deformable into a first state where the display unit is unfolded and a second state where the display unit is folded; a first body configured to support a first area of the display unit; a second body rotatably coupled to the first body and configured to support a second area of the display unit which is the other area except the first area; and a hinge configured to rotatably coupling the first body and the second body to each other, wherein the display unit comprises a flexible display; and a flexible frame coupled to a rear surface of the flexible display, and a metal member is coupled to the second body to pull the display unit toward the second body, corresponding to at least predetermined area of the second area of the display unit.

18 Claims, 8 Drawing Sheets

(a)

(b)

(56) References Cited

U.S. PATENT DOCUMENTS

| | | | |
|---|---|---|---|
| 2014/0226275 A1* | 8/2014 | Ko | G06F 1/1626 |
| | | | 361/679.27 |
| 2015/0055287 A1* | 2/2015 | Seo | G06F 1/1652 |
| | | | 361/679.27 |
| 2016/0070303 A1* | 3/2016 | Lee | G06F 1/1616 |
| | | | 361/679.27 |
| 2017/0038798 A1* | 2/2017 | Lee | G06F 1/1616 |
| 2017/0061836 A1 | 3/2017 | Kim et al. | |
| 2017/0094818 A1 | 3/2017 | Kim et al. | |
| 2018/0070460 A1* | 3/2018 | Han | G06F 1/1652 |
| 2019/0004764 A1* | 1/2019 | Son | G06F 3/1446 |

* cited by examiner (a)

(b)

(a)

(b)

(a)

(b)

(a)

(b)

(a)

(b)

(a)

(b)

MOBILE TERMINAL

CROSS-REFERENCE TO RELATED APPLICATIONS

Pursuant to 35 U.S.C. § 119(a), this application claims the benefit of earlier filing date and right of priority to Korean Patent Application No. 10-2018-0015454, filed on Feb. 8, 2018, the contents of which are hereby incorporated by reference herein in its entirety.

BACKGROUND OF THE DISCLOSURE

Field of the Disclosure

Embodiments of the present disclosure relate to a mobile terminal including a flexible display which is deformable by an external force.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, there are ongoing developments for a mobile terminal including a flexible display which is deformable by an external force. However, in case such a flexible display is deformed into a folded state or an unfolded state, there might be wrinkles on the flexible display, which might cause a problem of quality deterioration.

SUMMARY OF THE DISCLOSURE

Accordingly, an object of the present invention is to address the above-noted and other problems. Embodiments of the present disclosure provide a mobile terminal which may keep a flat state while a display area covering a hinge unit.

Embodiments of the present disclosure also provide a mobile terminal which may minimize the damage caused to a folded area of the flexible display unit by the repetition of the folded and unfolded states of the flexible display unit and which may enhance the quality of the image output of the folded area.

Embodiments of the present disclosure also provide a mobile terminal includes a metal member arranged under a preset folded or unfolded area (in other words, a bending area) of a display unit to pull the display unit.

The metal member may prevent one or more wrinkles from occurring on the bending area in a first state of the display unit.

More specifically, embodiments of the present disclosure may provide a mobile terminal comprising: a display unit which is deformable into a first state where the display unit is unfolded and a second state where the display unit is folded; a first body configured to support a first area of the display unit; a second body rotatably coupled to the first body and configured to support a second area of the display unit which is the other area except the first area; and a hinge configured to rotatably coupling the first body and the second body to each other, wherein the display unit comprises a flexible display; and a flexible frame coupled to a rear surface of the flexible display, and a metal member is coupled to the second body to pull the display unit toward the second body, corresponding to at least predetermined area of the second area of the display unit.

At least one of the flexible frame and metal member may be formed to have a magnetic force.

The second area may comprise a third area which winds around the hinge in the second state of the display unit, and the metal member is arranged corresponding to the third area.

The second body may comprise a first end adjacent to the hinge; and a second end relatively far from the hinge, and the metal member is arranged closer to the first end than the second end.

The mobile terminal of claim 3, wherein an installation portion recessed to install the metal member is formed in the second body.

The flexible frame may comprise a flexible portion in which a plurality of holes and a plurality of slits are formed; and a rigid portion arranged in a preset area adjacent to the flexible portion.

When the display unit is deformed between the first state and the second state, gaps between the holes are expanded or shrunk to apply a restitution force to the display unit.

The metal member may be arranged to overlap at least predetermined area thereof with the flexible portion.

The second body may comprise a lateral wall projected upwards to hide a lateral surface of the flexible portion in the first state.

The second body may comprise a first plate coupled to the hinge to be rotatable with respect to the first body; and a second plate connected with the first plate to be slidable with respect to the first plate.

The second plate may comprise a stepped portion to which the display unit is coupled; and a guide portion configured to guide the sliding motion of the second plate.

The guide portion may be stepped from the stepped portion in a direction which is directed farther from the display unit.

The mobile terminal may include a metal member arranged under a preset folded or unfolded area (in other words, a bending area) of a display unit to pull the display unit.

The metal member may prevent one or more wrinkles from occurring on the bending area in a first state of the display unit.

More specifically, the second body may further comprise an elastic member configured to connect one end of the first plate with the second plate.

The elastic member may be connected with the end of the first plate and a lateral surface of the guide portion which faces the end.

A concave portion in which a preset area of the elastic member may be inserted is formed in the end of the first plate, and the elastic member may be connected with an inner end of the concave portion and the lateral surface of the guide portion.

The elastic member may be formed of a compression spring, and the elastic member may be compressed in the first state of the display unit and apply a tensile force to the second plate with respect to the first plate in the first state of the display unit.

The shaft of the hinge provided in the mobile terminal may be rotatable between the first state and the second state. Meanwhile, in the first state, a magnet may be provided in the shaft of the hinge to apply a rotational force to a preset longitudinal-direction area of the display unit becoming deformed into the first state.

Accordingly, in the first state, the down-moving of the display unit caused by the longitudinal-direction weight of the display unit may be prevented and the wrinkles on the bending area of the display unit may be prevented.

More specifically, a first magnet may be provided in the first body, and a second magnet may be provided in a shaft of the hinge and arranged relatively closer to the first magnet in the first state and relatively farther from the first magnet in the second state.

The first magnet may be extended along a width direction of the first body, and the second magnet may be extended along a width direction of the hinge.

The second magnet may be provided in the shaft of the hinge to locate a first axis of the magnetic field generated in the first magnet not to coincide with a second axis of the magnetic field generated in the second magnet in the first state.

The second axis may be arranged to slope at a preset angle with respect to the first axis in a direction toward the second state.

The shaft of the hinge may be coupled to the second body to be rotatable together with the second body.

The shaft of the hinge may provide the second body with a rotational force in a direction where the second axis coincides with the first axis in the first state.

According to the embodiments of the present disclosure, the examples of the mobile terminal in accordance with the present disclosure may have following effects.

According to the embodiments, the mobile terminal is capable of keeping a flat state while a display area covering a hinge unit.

Furthermore, the mobile terminal is capable of minimizing the damage caused to a folded area of the flexible display unit by the repetition of the folded and unfolded states of the flexible display unit and enhancing the quality of the image output of the folded area.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
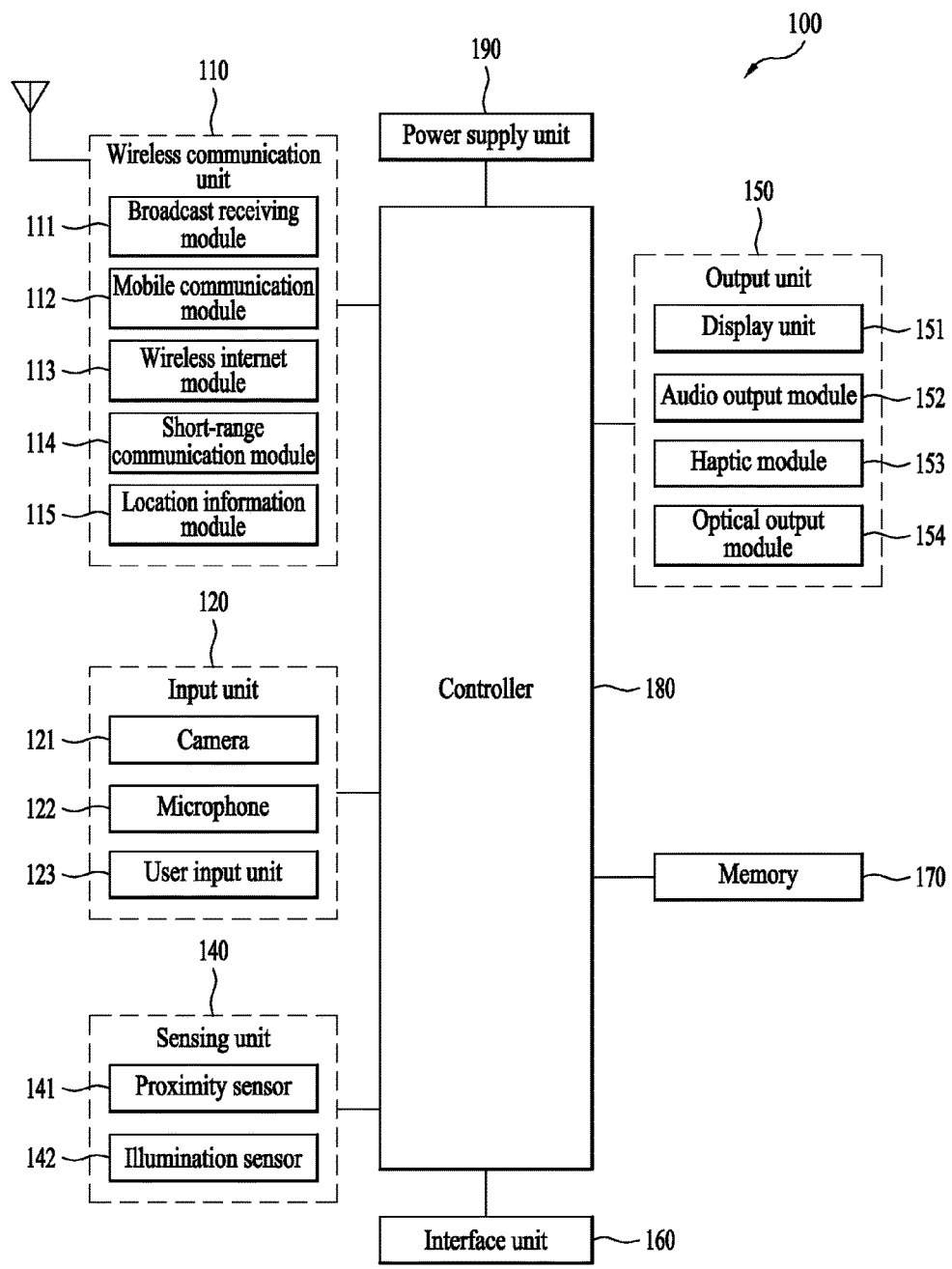
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The display unit 151 outputs information processed in the mobile terminal 100. For example, the display unit 151 may display information on an execution screen of an application program which is driven in the mobile terminal 100 and information on UI (User Interface) and GUI (Graphic User Interface) based on the execution image information.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

At least one antenna for wireless communication may be located on the terminal body.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the information processed in the mobile terminal in accordance with the present disclosure may be displayed by using a flexible display, which will be described in detail, referring to the accompanying drawings.

Figure 2:
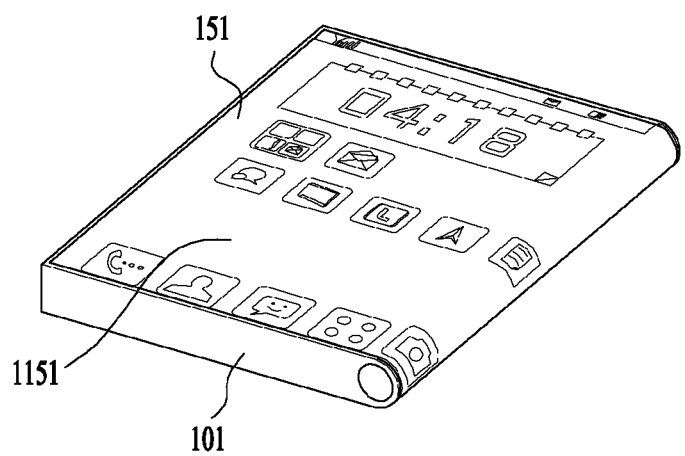
FIG. 2 is a conceptual diagram to describe a mobile terminal including a flexible display unit.
Figure 2:
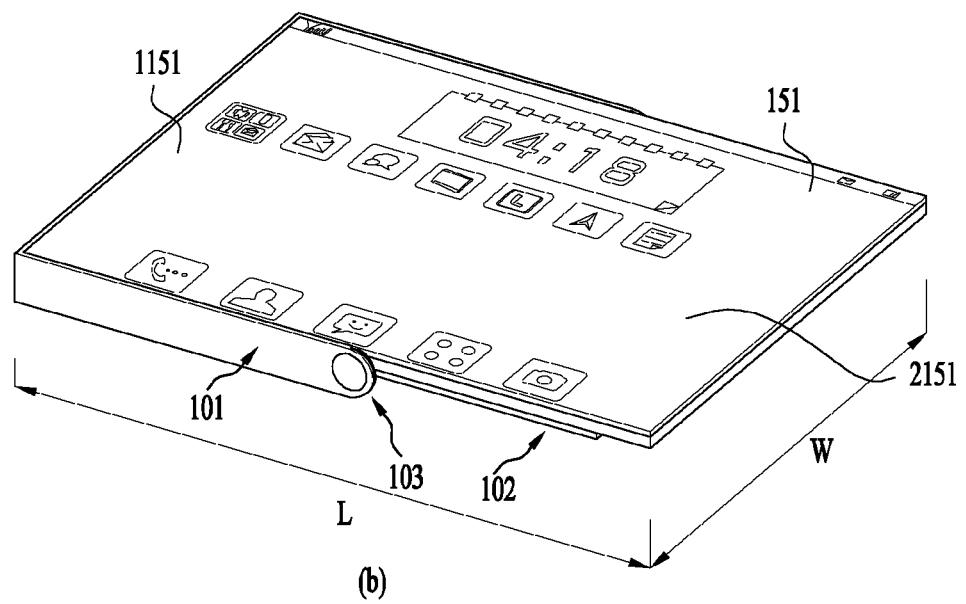

FIG. 2 is a conceptual diagram to describe another embodiment of the mobile terminal 200 which is deformable.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof.

A conventional flexible display is fabricated on a thin flexible substrate which is able to be bent, curved, folded, twisted or rolled, while keeping characteristics of a conventional flat display. Accordingly, the flexible display means a light and strong display which will not break easily.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The deformation of the flexible display unit 251 not limited to perform by an external force. For example, the flexible display unit 251 can be deformed into the second state from the first state by a user command, application command, or the like.

As mentioned above, the mobile terminal 100 in accordance with the above embodiment may include the display unit 151 which is deformable into a first state which is a unfolded state and a second state which is a folded state; and a body 101 and 102 which supports the display unit 151.

More specifically, the display unit 151 may be coupled or bonded to the body 101 and 102. The body 101 and 102 may include a first body 101 and a second body 102 which are rotatably coupled to each other. The first and second bodies 101 and 102 may be made of resin.

The first body 101 may support a predetermined area of the display unit 151 and the second body 102 may support the other area of the display unit 151.

More specifically, the first body 101 may support a first area 1151 of the display unit 151 and the second body 102 may support a second area 2151 of the display unit 151.

In this instance, the first area 1151 and the second area 2151 may be arranged in one side and the other side with respect to a longitudinal direction (L) of the display unit. In other words, the first area 1151 may be arranged in one side with respect to the longitudinal direction (L) of the display unit 151, corresponding to the first body 101. The second area 2151 may be arranged in the other opposite side with respect to the longitudinal direction (L) of the display unit 151, corresponding to the second body 102.

The first body 101 and the second body 102 coupled to each other may be relatively rotary while forming a preset angle. At this time, a display area arranged in a connected portion between the first body 101 and the second body 102 may be bendable and the flexible display unit 151 may be deformed into the second state where at least preset area is overlapped.

FIG. 2 (a) is a conceptual diagram illustrating the second state which is the folded state of the flexible display unit 151. FIG. 2 (b) is a conceptual diagram illustrating the first state which is the unfolded state of the flexible display unknit 151. In the drawings, only the first and second states are shown. While the flexible display unit is deformed from the first state into the second state, there is a state where the preset area of the flexible display unit 151 is bent at a preset angle with the other area.

In the second state, the first body 101 and the second body 102 are overlapped with each other and a boundary line between the first area 1151 and the second area 2151 is bent while forming a curve.

More specifically, the mobile terminal 100 may further include a hinge 103 which is provided between the first body 101 and the second body 102 to facilitate the relative rotation of the first and second bodies 101 and 102. For example, the second body 102 may be rotated on the hinge 103 as its axis toward a direction in which it is overlapped with the first body 102.

The first and second bodies 102 and 102 may be fabricated with a preset thickness. One or more electronic components for driving the mobile terminal 100 may be loaded in at least one of the first and second bodies 101 and 102.

Hereinafter, the structure of the flexible display unit will be described, referring to another drawing.

Figure 3:
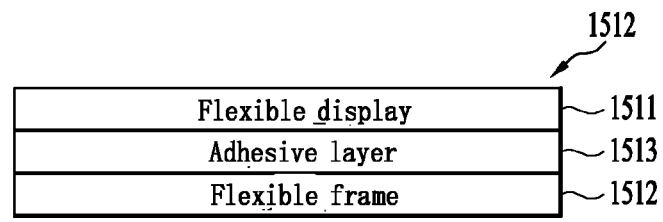
FIG. 3 is a diagram illustrating the flexible display unit.
Figure 3:
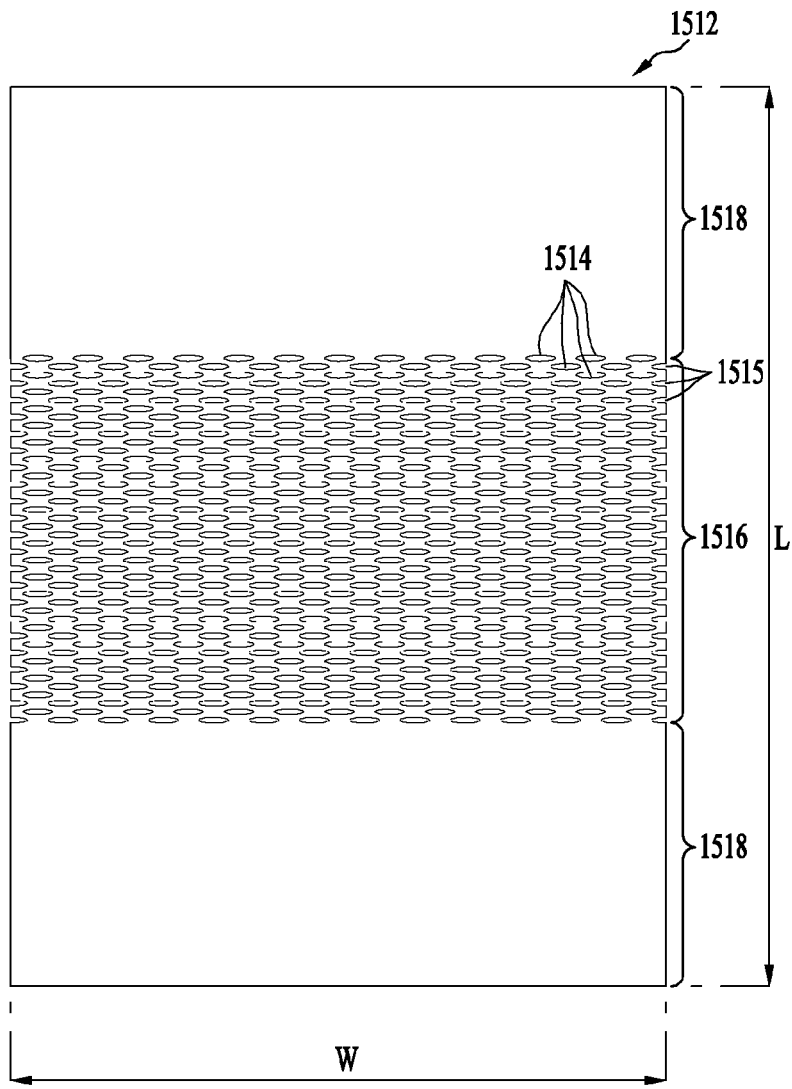

FIG. 3 is a diagram illustrating the flexible display unit. Specifically, FIG. 3 (a) is a conceptual diagram of the flexible display unit and FIG. 3 (b) is a diagram illustrating a flexible frame provided in the flexible display unit.

Referring to FIG. 3 (a), the flexible display unit 151 may include a display 1511 and a frame 1512 coupled to the display 1511. A flexible display may be provided as the display 1511 and a flexible frame may be provided as the frame 1512.

The display 1511 may include one or more of LCD (Liquid Crystal Display), TFT LCD (Thin Film Transistor-liquid Crystal Display), OLED (Organic Light-emitting Diode), flexible display, 3D display and E-ink display.

The flexible frame 1512 may be coupled or bonded to a rear surface of the flexible display 1511. In other words, the flexible display 1511 may be coupled or bonded on the flexible frame 1512.

For example, the flexible frame 1512 may be bonded to the rear surface of the flexible display 1511 by using an adhesive. In other words, the flexible display unit 151 may further include an adhesive layer 1513 provided between the flexible display 1511 and the flexible frame 1512.

The flexible frame 1512 may be made of a flat metallic frame. For example, the flexile frame 1512 may be formed of a thin metal plate having the elasticity which is strong enough to be unfolded after folded.

When the flexible display 151 is folded or unfolded, the flexible display 1511 and the flexible frame 1512 may be folded or unfolded at the same time.

Referring to FIG. 3 (*b*), the flexible frame 1512 may include a flexible portion 1516 which is flexible at the preset maximum curvature.

More specifically, the flexible frame 1512 may include a flexible portion 1516 having a plurality of holes 1514 and a plurality of slits 1515; and a rigid portion 1518 arranged adjacent to a predetermined area of the flexible portion 1516.

The plurality of the holes 1514 and the plurality of the slits 1515 may be formed in the flexible portion 1516 to realize the folding of the flexible portion 1516. That is, the holes 1514 and the slits 1515 may allow the flexible portion 1516 to have flexibility and be bent at the preset maximum curvature in a state of having the elasticity.

The holes 1514 may be repeatedly formed along a longitudinal direction (L) and a width direction (W) at preset intervals. The slits 1515 may be arranged in both width-direction ends of the flexible portion 1516.

When the display unit 151 is deformed between the first state and the second state, the intervals between the holes 1514 and the slits 1515 are expanded or shrunk to apply a restoring force (or restitution force) to the display unit 151.

The rigid portion 1518 may be arranged in both side areas with respect to the longitudinal direction of the flexible portion 1516. In other words, a pair of rigid portions 1518 may be arranged in longitudinal-direction side areas of the flexible frame 1512 with respect to the flexible portion 1516, respectively.

One of the two rigid portions 1518 is corresponding to the first area 1151 and the first body 101 of the display unit 151. The other one is corresponding to the second area 2151 and the second body 102.

Meanwhile, in case the flexible display unit 151 is repeatedly folded or unfolded, one or more wrinkles are likely to occur on the folded or unfolded area and such wrinkles might deteriorate the image output quality. Hereinafter, referring to a further drawing, the structure for preventing wrinkles even with repeated folded and unfolded operations will be described.

Figure 4:
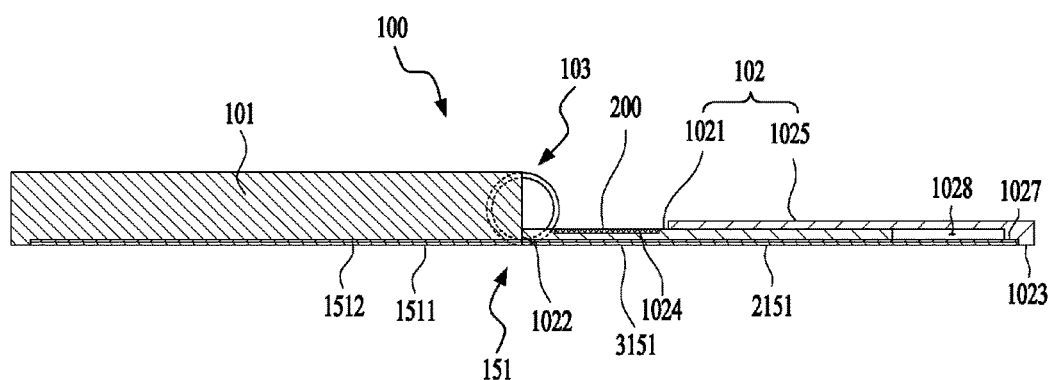
FIG. 4 is a diagram illustrating a state where a structure for preventing a wrinkle of a display unit in accordance with one embodiment is applied to the mobile terminal.
Figure 4:
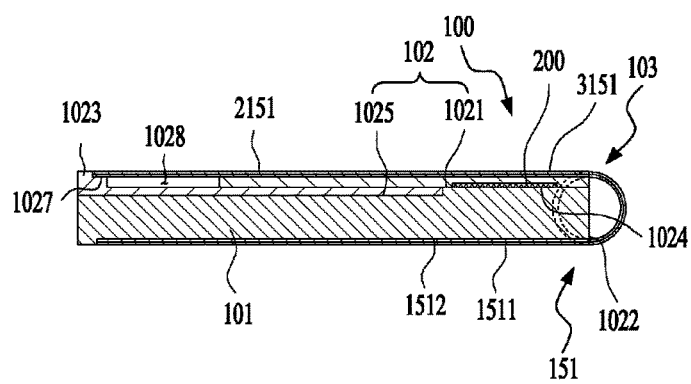

FIG. is a diagram illustrating a state where a structure for preventing a wrinkle of a display unit in accordance with one embodiment is applied to the mobile terminal. FIG. 4 (*a*) illustrates the first state and FIG. 4 (*b*) illustrates the second state.

Figure 8:
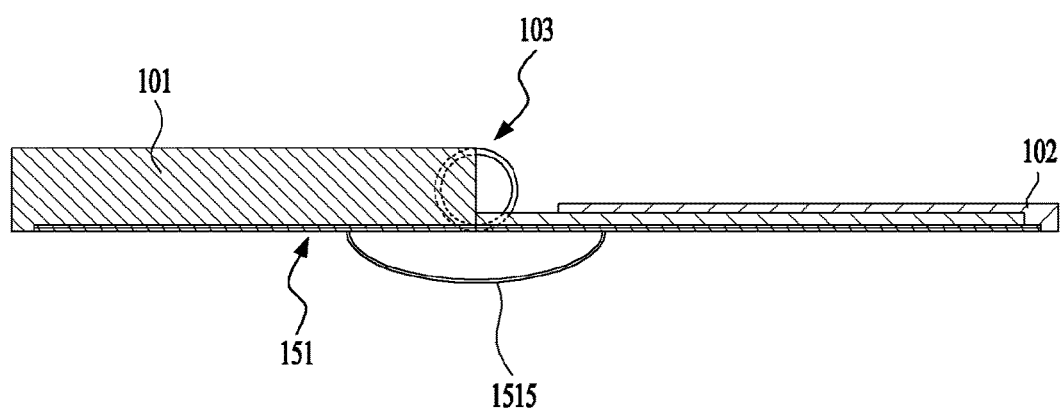
FIG. 8 is a conceptual diagram to describe a mobile terminal in case the structure for preventing the wrinkles of the display unit is not applied.

When the second body 102 is folded or unfolded toward the first body 101, one or more wrinkles might occur in the area which is bent from the display unit 151 with respect to the hinge 103 (or the boundary area between the first area 1151 and the second area 2151) (see FIG. 8).

To prevent such wrinkles, a metal member 200 may be coupled to the second body 102 to pull the display unit 151 toward the second body 102.

The metal member 200 may be coupled to the rear surface of the second body 102. In other words, the metal member 200 may be coupled to the second body 102 from the opposite side of the display unit 151. Specifically, the metal member 200 may be arranged to face the display unit 151, while having the second body disposed there between.

For example, the metal member 200 may be arranged, corresponding to a preset area of the second area 2151. Accordingly, the wrinkles generated in the corresponding area of the flexible display unit 151 to the metal member 200 may be prevented.

At least one of the flexible frame 1512 and the metal member 200 may be formed to have a magnetic force, so that gravitation or a gravitational pull toward the metal member 200 can be applied to the flexible frame 1512. In other words, the gravitation toward the metal member 200 may be applied to the flexible display 151.

More specifically, the second area 2151 may include a third area 3151 winding the hinge 103 in the second state of the display unit 151. The metal member 200 may be arranged corresponding to the third area 3151. In other words, the metal member 200 may be arranged corresponding to the third region 3151 in the first state where the display unit 151 is unfolded. That is because the third area 3151 has a high possibility of the wrinkle generation.

The second body 102 may include a first end 1022 adjacent to the hinge 103; and a second end arranged relatively farther from the hinge 103. The metal member 200 may be arranged closer to the first end 1022 than the second end 1023, because wrinkles may be more likely to occur in the display area adjacent to the first end 1022 of the second body 102.

An installation portion 1024 for arranging the metal member 200, with a preset length may be formed in the second body 102. More specifically, the installation portion 1024 may be recessed from the rear surface of the second body 102 by a preset length so as to arrange the metal member 200. The metal member 200 may be coupled to the second body 102 in a state of being insertedly installed in the installation portion 1024 so that the interference of the metal member 200 may be prevented during the sliding motion of the second body 102, which will be described later.

Meanwhile, the wrinkle on the display unit 151 is likely to occur in the area corresponding to the flexible portion 1516 of the flexible frame 1512 mentioned above referring to FIG. 3. Accordingly, it is preferred that a predetermined area of the metal member 200 is overlapped with the flexible portion 1516.

When the display unit 151 is deformed into the first state from the second state, the second body 102 needs to be extended from the display unit 151 as far as the area partially winding the hinge 103.

The second body 102 may include a first plate 1021 coupled to the hinge 102 to be rotatable with respect to the first body 101; and a second plate 1025 sliding-movable with respect to the first plate 1021.

The first plate 1021 may be coupled to the hinge 103 to be relatively rotatable with respect to the first body on the hinge 103 as its axis. The second plate 1025 may be connected with the first plate 1021 to be able to slide with respect to the first plate 1021.

More specifically, the second plate 1025 may include a stepped portion 1027 having the display unit 151 thereto; and a guide portion 1028 provided to guide the sliding motion of the second plate 1025.

The stepped portion 1027 may be stepped toward the rear surface of the second plate 1025. The display unit 151 may be coupled or bonded to the stepped portion 1027 by using an adhesive.

The guide portion 1028 may be formed to partially cover the first plate 1021. The guide portion 1028 may be stepped from the stepped portion in a direction which is much farther from the display unit 151.

Accordingly, the second plate is able to slide along a longitudinal direction of the first plate 1021 fixed to the hinge 103.

Hereinafter, referring to a further drawing, another embodiment of the structure for preventing the wrinkle on the display unit will be described.

Figure 5:
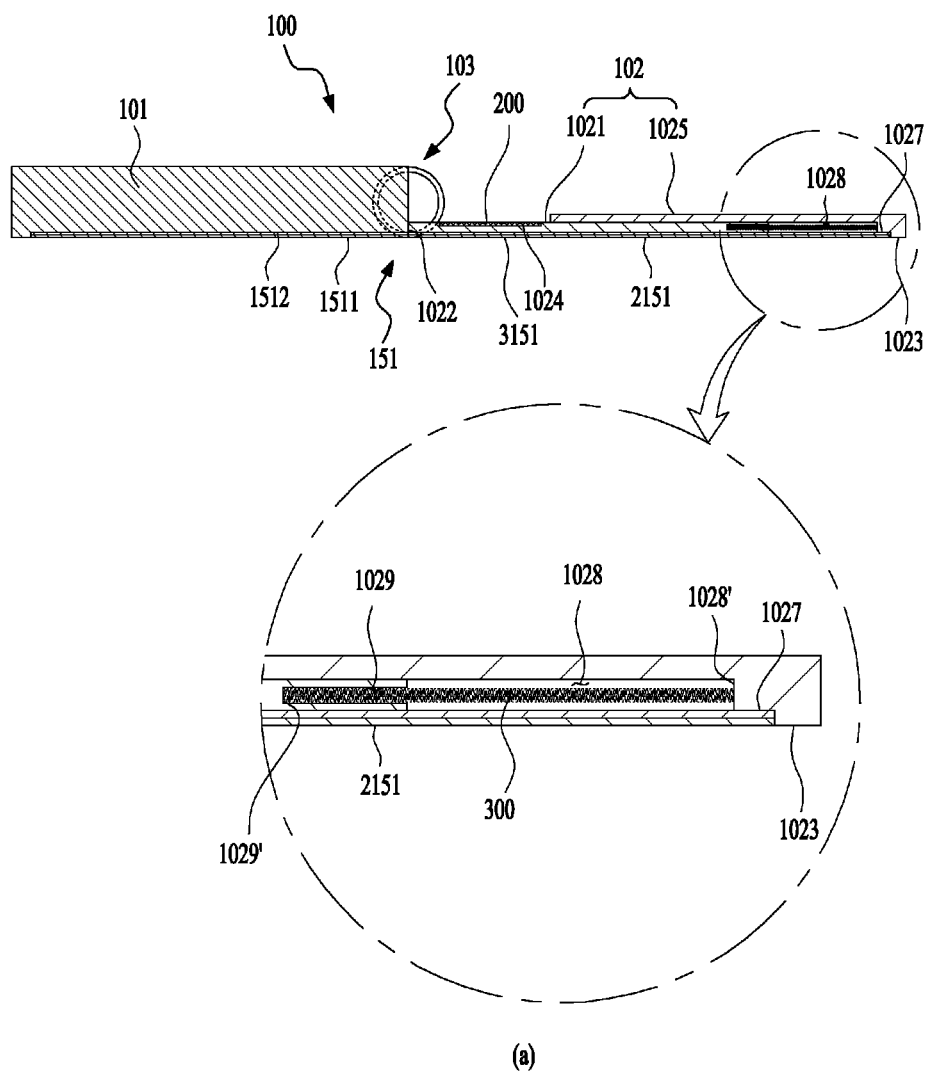
FIG. 5 is a diagram illustrating a state where a structure for preventing a wrinkle of a display unit in accordance with another embodiment is applied to the mobile terminal.
Figure 5:
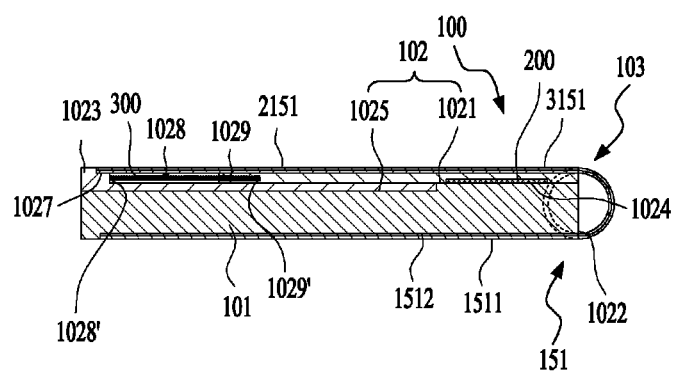

FIG. 5 is a diagram illustrating a state where a structure for preventing a wrinkle of a display unit in accordance with another embodiment is applied to the mobile terminal. More specifically, FIG. 5 (*a*) illustrates the first state and FIG. 5 (*b*) illustrates the second state.

In this embodiment, the mobile terminal 100 may further include an elastic member 300 for preventing the wrinkle which is likely to occur on the display unit 151. Even without other description, the all of the elements mentioned in the embodiment of FIG. 4 may be applied to this embodiment of FIG. 5.

Hereinafter, the repeated description of the elements mentioned in the embodiment of FIG. 4 will be omitted and the description of this embodiment will be focused on the elastic member 200.

Referring to FIG. 5, the mobile terminal 100 may further include the elastic member 300 provided to apply a tensile force to the second area 2151 of the display unit 151 in the second state where the flexible display unit 151 is unfolded.

The elastic member 200 may be provided to apply a tensile force to the second area 2151 in a direction, which is directed to become farther from the hinge, in the first state. Accordingly, wrinkles may be prevented from occurring in the boundary between the first area 1151 and the second area 2151 in the flexible display unit 151 in the first state.

The elastic member 200 may be provided in the second body 102. The second body 102 may include the elastic member 200 which connects one end 1022' of the first plate 1021 with the second plate 1025. One end 1022' of the first plate 1021 may mean a free end of the first plate 1021 arranged relatively far from the hinge 103.

In the first state, the tensile force may be applied to the second plate 1025 in the direction which is directed to become farther from the end of the first plate 1021 (in other words, the direction directed to become farther from the hinge 103) by the elastic member 200. Accordingly, the flexible display unit 151 may be kept flat with no wrinkles in the first state.

More specifically, the elastic member 200 may be connected with the end 1022' of the first plate 1021 and a lateral surface 1028' of the guide portion 1028 facing the end 1022'. In this instance, the lateral surface 1028' of the guide portion 1028 may mean the lateral surface which faces the end 1022' out of the surfaces defining the guide portion 1028.

Accordingly, the tensile force may be applied to a preset area of the first plate 1021 in the direction in which the second plate 1025 becomes farther from the hinge 103 in a state where the first plate 1021 is partially inserted in the guide portion 1028 of the second plate 1025.

A concave portion 1029 may be formed in the end 1022' of the first plate 1021 and the elastic member 200 may be partially inserted in the concave portion 1029. In other words, the elastic member 200 may be insertedly seated in the concave portion 1029 to a preset length. The elastic member 200 may be connected with an inner end 1029' of the concave portion 1029 and a lateral surface 1028' of the guide portion 1028.

The concave portion 2019 may prevent the elastic member 200 from escaping from a preset position and facilitate the application of the elastic member 200 having a stronger tensile force.

For example, a compression spring may be provided as the elastic member 200. Accordingly, the length of the elastic member 200 which is applicable as long as the depth of the concave portion 2019 may be increased and the tensile force of the elastic member 200 may be increased.

The elastic member 200 may be compressed in the second state of the display unit 151 and apply the tensile force to the second plate 1025 with respect to the first plate 1021 in the first state of the display unit 151.

Hereinafter, referring to a further drawing, a further embodiment of the structure for preventing the wrinkle on the display unit and also preventing the moving-down of the second area.

Figure 6:
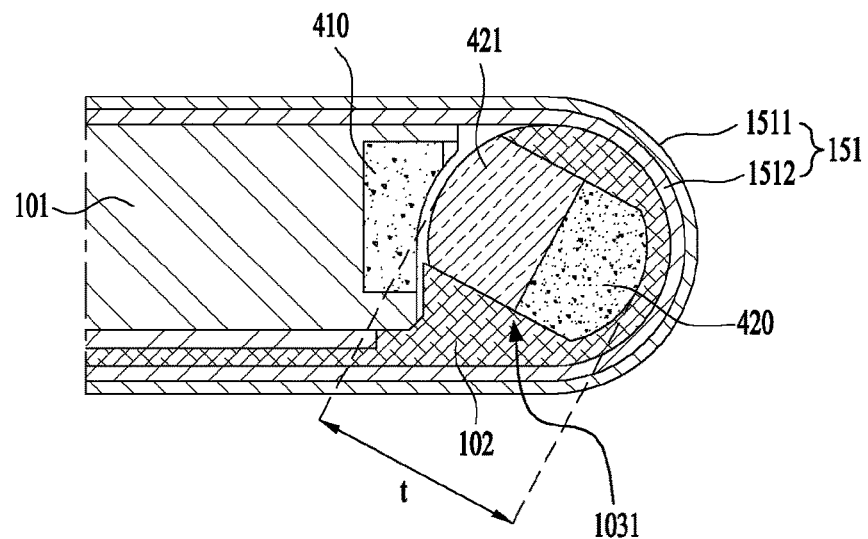
FIG. 6 is a diagram illustrating a state where a structure for preventing a wrinkle of a display unit in accordance with one embodiment is applied to the mobile terminal.
Figure 6:
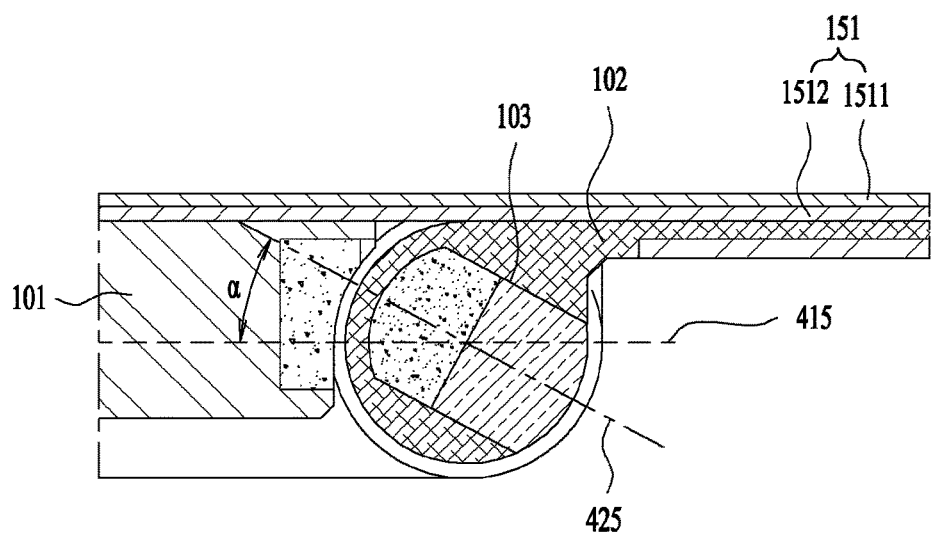

FIG. 6 is a diagram illustrating a state where a structure for preventing a wrinkle of a display unit in accordance with one embodiment is applied to the mobile terminal. More specifically, FIG. 6 (*a*) illustrates the second state and FIG. 6 (*b*) illustrates the first state.

In this embodiment, the mobile terminal 100 may further include magnets for preventing the wrinkle which is likely to occur on the display unit 151 and also preventing the moving-down of the second area. Even without other description, the all of the elements mentioned in the embodiment of FIGS. 4 and 5 may be applied to this embodiment of FIG. 6.

Hereinafter, the repeated description of the elements mentioned in the embodiment of FIGS. 4 and 5 will be omitted and the description of this embodiment will be focused on the magnets.

Referring to FIG. 6, the hinge 103 mentioned above may include a shaft 1031 coupled to the second body 102 to rotate together with the second body 102. In other words, the hinge 103 may include the shaft 1031 coupled to the first plate 1021 of the second body 102 rotatable together with the first plate 1021.

A first magnet 410 may be provided in the first body 101 and a second magnet 420 may be provided in the shaft 1031 of the hinge 103, corresponding to the first magnet 410. For example, the shaft 1031 may have a preset thickness (t) and a predetermined area of the shaft 1031 may be formed of the second magnet 420 and the other thickness may be formed of a non-magnetic material (e.g., a resin material). More specifically, the second magnet 420 may be provided in a predetermined thickness-direction area of the shaft 1031 and the non-magnetic material 421 may be provided in the other thickness-direction area of the shaft 1031, with respect to a cross-section of the shaft 1031.

The second magnet 420 may be provided in the shaft 1031 to be arranged relatively closer to the first magnet 410 in the first state and relatively farther from the first magnet 410 in the second state. Especially, the first magnet 410 may be arranged to locate its polarity facing the opposite polarity of the second magnet 420, so as to generate the gravitation, in other words, gravitational pull with the second magnet 420.

In the second state, the repulsive or gravitational pulling force generated between the first and second magnets 410 and 420 may not be so strong by the distance between them and the non-magnetic material disposed between them.

In the first state, the second body 102 may be kept flat with respect to the first body 101 by the gravitational pulling force generated between the first and second magnets 410 and 420. In other words, the first and second magnets 410 and 420 may prevent the second body 102 from going down in a direction where the second body 102 is deformed from the first state to the second state by the weight.

The first magnet 410 may be extended along a width direction of the first body 101 and the second magnet 420 may be extended along a width direction of the hinge 103. For example, the first magnet 410 may be extended in the entire-width direction of the first body 101 and the second magnet 420 may be extended in the entire-width direction of the hinge 103 (or the longitudinal direction of the hinge). Accordingly, the moving-down of the second body 102 in the first state may be prevented in the entire-width direction of the display unit 151.

Meanwhile, to prevent the moving-down of the second area 2151 in the display unit 151 corresponding to the second body more surely, it is preferred that the rotational force of the shaft 1031 is maintained in the hinge 103 in the first state. In this instance, the rotational force may be the rotational force in the reverse direction of the rotation toward the second state.

For example, when the two magnets are facing each other, the axes of the magnetic fields generated in the magnets tend to coincide with each other. In other words, the axis of the magnetic field generated in one magnet does not coincide with the axis of the magnetic field generated in the other one and the magnets will be rotated in a direction to coincide the axes with each other.

More specifically, in the first state, the second magnet 420 may be provided in the shaft 1031 of the hinge 103 to make the first axis 415 of the magnetic field generated in the first magnet 410 not coincide with the second axis 425 of the magnetic field generated in the second magnet 420.

That is, the first magnet 410 and the second magnet 420 are arranged closer to each other in the first state than the second state. The first magnet 410 is fixed to the first body 101. At this time, unless the first axis 415 of the magnetic field generated in the first magnet 410 coincide with the second axis 425 of the magnetic field generated in the second magnet 420, the second magnet 420 tends to rotate in the direction in which the axes coincide with each other. In the first state, the second body 102 may be kept flat with the first body 101 without moving down by the force of the second magnet 420 which tends to rotate.

It is preferred in the first state that the first magnet 410 and the second magnet 420 are arranged to locate the first axis 415 and the second axis 425 at a preset acute angle. More specifically, in the first state, the second axis 425 may be arranged to slope at a preset angle ($\alpha$) with respect to the first axis 415 in the direction toward the second state.

In the first state, the shaft 1031 of the hinge 103 may provide a rotational force to the second body 102 in a rotational direction in which the second axis 425 coincides with the first axis 415. In the illustrated embodiment, the shaft 1031 of the hinge 103 may provide the second body 102 with a rotational force in a counter-clockwise direction.

As mentioned above, the axis of the magnetic field generated in the first magnet 410 provided in the first body is arranged not to coincide with the axis of the magnetic field generated in the second magnet 420 in the first state. Accordingly, the moving-down of the second body 102 in the first state may be prevented.

Hereinafter, referring to a further drawing, a structure for preventing a lateral surface of the display unit 151 from being exposed outside will be described.

Figure 7:
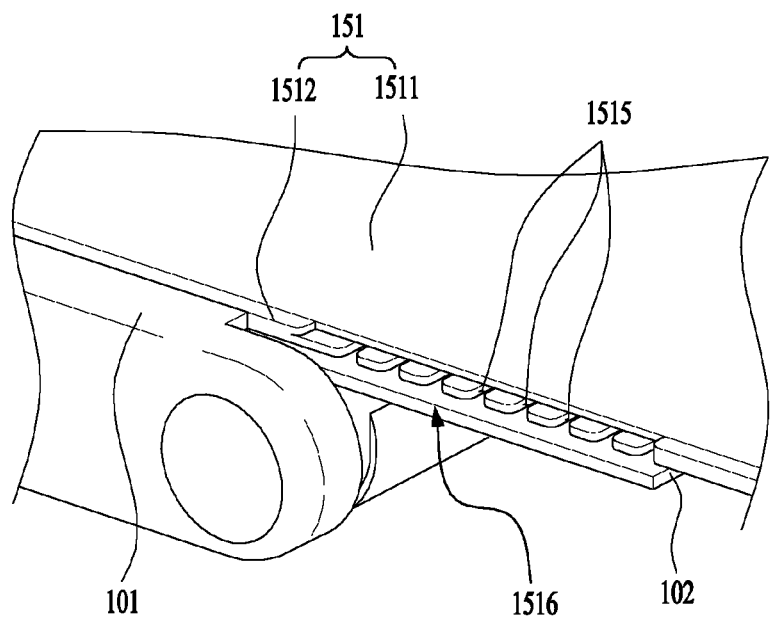
FIG. 7 is a diagram illustrating a structure for preventing the exposure of a lateral surface of the display unit.
Figure 7:
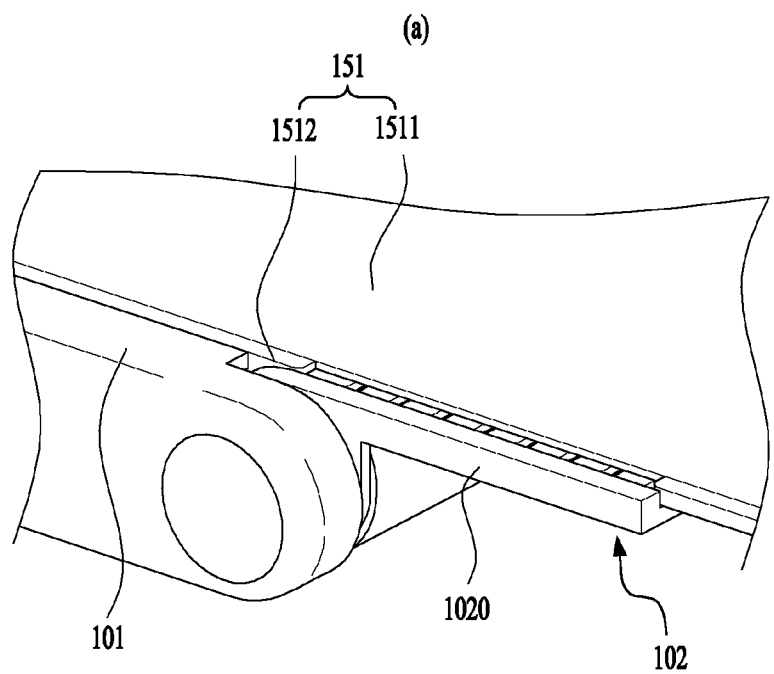

FIG. 7 is a diagram illustrating a structure for preventing the exposure of a lateral surface of the display unit. Specifically, FIG. 7 (a) illustrates a state where the lateral surface of the display unit is exposed and FIG. 7 (b) illustrates a state where the exposure of the lateral surface is blocked.

Referring to FIG. 7 (a), the flexible frame 1512 may be disposed in the rear surface of the flexible display 1511 as mentioned above. At this time, a plurality of slits 1515 may be formed in both width-direction ends of the flexible frame 1512. More specifically, the plurality of the slits 1515 may be formed in the two width-direction ends of the flexible portion 1516 provided in the flexible frame 1512.

In the first state, the slits 1515 are likely to be exposed outside. In this instance, the display unit 151 (in other words, the flexible frame 1512) might be damaged by an external shock.

To prevent such damage, the second body 102 may include a lateral wall 1020 projected upwards to cover a lateral surface of the flexible portion 1516 in the first state.

The lateral wall 1020 may be projected higher than the thickness of the flexible frame 1512. Also, the lateral wall 1020 may be provided in each of the width-direction sides of the first body 102.

The lateral walls 1020 may prevent the slits 1515 formed in the flexible frame 1512 from being exposed to the two width-direction lateral surfaces of the flexible frame 1512 and also prevent the damage to the flexible frame 1512, which might be caused by an external shock, in the second state.

Meanwhile, the lateral walls 1020 may be spaced a preset distance apart from the two width-direction ends of the flexible frame 1512.

In other words, the lateral walls 1020 may be projected upwards from a location corresponding to the flexible portion 1516 of the flexible frame 1512, while spaced apart outwards from the two width-direction ends of the flexible frame 1512 with respect to the width direction of the flexible frame 1512.

In the first state, the two width-direction ends of the flexible portion 1516 may be exposed to external air via the gap formed between the two width-direction ends of the flexible ends 1512 and the lateral walls 1020.

Accordingly, the heat generated in the display unit 151 may be radiated outside via the space or gap formed between the lateral walls 1020 and the flexible frame 1512.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a display unit comprising a flexible display and a flexible frame coupled to a rear surface of the flexible display, and deformable into a first state where the display unit is unfolded and into a second state where the display unit is folded;
a first body configured to couple and support a first area of the display unit;
a second body configured to support a second area of the display unit different from the first area, the second body comprising a first plate rotatably coupled to the first body and a second plate coupled with the display unit and slidable with respect to the first plate;
a hinge configured to rotatably couple the first body and the first plate of the second body to each other; and
a metal member coupled to the first plate of the second body,
wherein the second area of the display unit comprises a third area which winds around the hinge when the display unit is in the second state, and
wherein at least one of the flexible frame or the metal member is formed to exert a magnetic force to pull the third area of the second area of the display unit toward the second body when the display unit is in the second state.

2. The mobile terminal of claim 1, wherein an installation portion recessed to install the metal member is formed in the second body.

3. The mobile terminal of claim 1, wherein:
the flexible frame comprises:
a flexible portion in which a plurality of holes and a plurality of slits are formed; and
a rigid portion arranged in a preset area adjacent to the flexible portion; and
when the display unit is deformed between the first state and the second state, gaps between the holes are expanded or shrunk to apply a restitution force to the display unit.

4. The mobile terminal of claim 3, wherein the metal member is arranged such that at least a predetermined area of the metal member overlaps with the flexible portion of the flexible frame.

5. The mobile terminal of claim 3, wherein the second body comprises:
a lateral wall projected upwards to hide a lateral surface of the flexible portion when the display unit is in the first state.

6. The mobile terminal of claim 1, wherein the second plate comprises:
a stepped portion to which the display unit is coupled; and
a guide portion configured to guide a sliding of the second plate with respect to the first plate.

7. The mobile terminal of claim 6, wherein the guide portion of the second plate is stepped from the stepped portion of the second plate in a direction leading away from the display unit.

8. The mobile terminal of claim 6, wherein the second body further comprises:
an elastic member configured to connect an end of the first plate with the second plate.

9. The mobile terminal of claim 8, wherein the elastic member is connected with the end of the first plate and a lateral surface of the guide portion which faces the end of the first plate.

10. The mobile terminal of claim 9, wherein:
a concave portion in which a preset area of the elastic member is to be inserted is formed in the end of the first plate; and
the elastic member is connected with an inner end of the concave portion and the lateral surface of the guide portion.

11. The mobile terminal of claim 8, wherein:
the elastic member is formed of a compression spring; and
when the display unit is in the first state, the elastic member is compressed and applies a tensile force to the second plate with respect to the first plate.

12. The mobile terminal of claim 1, wherein:
a first magnet is provided in the first body; and
a second magnet is provided in a shaft of the hinge and arranged relatively closer to the first magnet when the display unit is in the first state, and relatively farther from the first magnet when the display unit is in the second state.

13. The mobile terminal of claim 12, wherein:
the first magnet extends along a width direction of the first body; and
the second magnet extends along a width direction of the hinge.

14. The mobile terminal of claim 12, wherein the second magnet is provided in the shaft of the hinge such that, when the display unit is in the first state, an axis of a magnetic field generated by the first magnet does not coincide with an axis of a magnetic field generated by the second magnet.

15. The mobile terminal of claim 14, wherein, when the display unit is in the first state, the axis of the magnetic field generated by the second magnet forms a preset angle with respect to the axis of the magnetic field generated by the first magnet.

16. The mobile terminal of claim 14, wherein:
the shaft of the hinge is coupled to the second body to be rotatable together with the second body; and
when the display unit is in the first state, the shaft of the hinge provides the second body with a rotational force in a direction counter to a direction in which the shaft of the hinge would rotate when the display unit is deformed into the second state.

17. A mobile terminal comprising:
a display unit comprising a flexible display and a flexible frame coupled to a rear surface of the flexible display;
a first body configured to support a first area of the display unit;
a second body rotatably coupled to the first body and configured to support a second area of the display unit different from the first area;
a hinge configured to rotatably couple the first body and the second body to each other;
a first magnet provided in the first body; and
a second magnet provided in a shaft of the hinge,
wherein the display unit is deformable into a first state where the display unit is unfolded and into a second state where the display unit is folded, and
wherein the second magnet is arranged relatively closer to the first magnet when the display unit is in the first state, and relatively farther from the first magnet when the display unit is in the second state.

18. The mobile terminal of claim 17, wherein the second magnet is provided in the shaft of the hinge such that, when the display unit is in the first state, an axis of a magnetic field generated by the first magnet does not coincide with an axis of a magnetic field generated by the second magnet.

* * * * *